US012123439B1

(12) United States Patent
Zou

(10) Patent No.: US 12,123,439 B1
(45) Date of Patent: Oct. 22, 2024

(54) INCREMENTAL SOLID-FLUID COUNTERCURRENT CONTACTING APPARATUS

(71) Applicant: Baisheng Zou, Spring, TX (US)

(72) Inventor: Baisheng Zou, Spring, TX (US)

(*) Notice: Subject to any disclaimer, the term of this patent is extended or adjusted under 35 U.S.C. 154(b) by 0 days.

(21) Appl. No.: 18/671,719

(22) Filed: May 22, 2024

Related U.S. Application Data

(60) Provisional application No. 63/551,385, filed on Feb. 8, 2024.

(51) Int. Cl.
*F15D 1/10* (2006.01)
*F28D 19/04* (2006.01)

(52) U.S. Cl.
CPC ................ *F15D 1/10* (2013.01); *F28D 19/04* (2013.01)

(58) Field of Classification Search
CPC . F15D 1/10; F28D 19/04; F28D 17/04; B01D 15/361
USPC .............................................................. 165/6
See application file for complete search history.

(56) References Cited

U.S. PATENT DOCUMENTS 1,404,626 A * 1/1922 Mathy ..................... F28D 17/04 432/182
1,746,598 A 2/1931 Ljungström
5,676,826 A 10/1997 Rossiter et al.
6,431,202 B1 8/2002 Ahlgren et al.
6,802,970 B2 * 10/2004 Rochette .................. B01J 47/00 210/267
7,141,172 B2 * 11/2006 Wang ................. B01D 53/0446 210/659
7,762,808 B2 * 7/2010 Lee ......................... F28D 19/04 165/8
8,985,151 B1 3/2015 Zou
9,120,049 B2 * 9/2015 Sundaram ............. F16K 31/041
10,589,190 B2 3/2020 Zou
11,083,980 B2 8/2021 Zou
11,738,286 B2 8/2023 Zou
2012/0111435 A1 5/2012 Antonetti

* cited by examiner

*Primary Examiner* — Jon T. Schermerhorn, Jr.
(74) *Attorney, Agent, or Firm* — Egbert, McDaniel & Swartz, PLLC

(57) ABSTRACT

A counter-current apparatus uses solid blocks to carry mass or heat storage medium to opposite sides of mass and heat transfer operations. The blocks are pushed incrementally through two channels. The energy of sensible heat or mass of selected species from a first fluid stream transfers into the solid blocks in a first channel and is stored in the solid storage medium within. Those solid blocks loaded with energy or specific mass from the first channel are pushed to a second channel in which the energy or specific mass stored within is released to a second fluid stream. The solid blocks in the second channel are pushed back into the first channel, continuing the heat transfer or mass transfer cycle. Counter-current flows of the fluid phase and the solid phase are achieved in both channels, for a combined adsorption and desorption cycle, or a combined heating and cooling cycle.

19 Claims, 8 Drawing Sheets

INCREMENTAL SOLID-FLUID COUNTERCURRENT CONTACTING APPARATUS

CROSS-REFERENCE TO RELATED APPLICATIONS

The present application claims priority to U.S. Provisional Application No. 63/551,385, filed Feb. 8, 2024.

BACKGROUND OF THE INVENTION

The present invention relates to the field of solids-fluids contacting operations. More particularly, the present invention relates to incremental countercurrent contacting of solids and fluids that can be used in regenerative heat exchangers, ion exchange and adsorption/desorption columns.

The main bodies of certain classes of process equipment need to be regenerated or renewed after a certain time period of operation. That equipment can include regenerative heat exchangers, regenerative thermal oxidizers, moving bed (simulated or real) chemical reactors/chromatographic separators, adsorption/desorption columns, ion exchange columns and regenerative air dehumidifiers. The regeneration methods include rotating the main body of the equipment or switching on and off a multitude of valves so that different sections of the main body can be contacted by different kinds of fluids at different times. The present invention attempts to optimize continuous countercurrent operation for such a multitude of processes.

For continuous operations of heat transfer or mass transfer from one phase to another, counter-current operation is more efficient than co-current or crossflow operations. The counter-current operation can be easily implemented if both phases are fluids but immiscible to each other, since fluids can be pumped around and flow easily.

If one material is a solid and another material is a fluid, counter-current flow becomes more difficult, since moving solid within a vessel or transporting solid from one vessel to another can present mechanical and efficiency problems.

U.S. Pat. No. 1,746,598 issued to Fredrik Ljungström describes a rotary air preheater that rotates heat storage materials in a cylindrical bed. Hot flue gas flows up in one half of the bed, and cold air flows down in the other half and gets heated up. This technology was credited with saving 4,960,000,000 tons of oil, and was distinguished as the 44th International Historic Mechanical Engineering Landmark by the American Society of Mechanical Engineers.

U.S. Pat. No. 5,676,826 issued to Rossiter and Riley disclosed a fluid-solid contacting apparatus employing a rotary valve to conduct fluid streams to and from the apparatus. The fluid-solid contacting apparatus of such a design comprises a plurality of chambers containing solid, with chambers installed on a turntable. While such a design can achieve counter-current solid-fluid contact, a turntable loaded with chambers may cause mechanical difficulties when the size of chambers becomes large and heavy.

U.S. Pat. No. 6,431,202 describes a rotary valve with mechanical improvement over the apparatus of U.S. Pat. No. 5,676,826, but it still requires a turntable.

U.S. patent application No. 20120111435 discloses a turntableless rotary fluid distributor design which is however mechanically complex, and cumbersome for large fluid flows.

U.S. Pat. No. 8,985,151 discloses a rotary fluid distribution apparatus which does not require a turntable for fluid distribution and direction. However, the solid-fluid contact pattern disclosed are mainly crossflows, not true counter-current flows.

U.S. Pat. Nos. 11,738,286, 11,083,980, and 10,589,190 disclose a number of rotary fluid distribution apparatuses. The counter-current apparatuses use a rotor to direct fluids to multiple stationary columns. By the action of the rotor, counter-current flows of a fluid phase and a solid phase can be achieved for a combined adsorption and desorption cycle, or a combined heating and cooling cycle. The apparatus allows not only countercurrent solid-fluid flows based on columns in series, but also countercurrent solid-fluid flows in the length of each individual column.

Those countercurrent apparatuses require complex routing of fluid phases, and multitude of piping and vessels. The complex flow passages of fluid create in some cases high pressure drops of the fluid phases, and slight reduction of efficiency because of nonoperative volumes in multitude of piping and vessels. Nonoperative volumes refer to volumes within the piping, and volumes of top and bottom open space that does not contain solid heat or mass storage medium in the contact vessels.

It is an object of the present invention to provide an apparatus that minimizes fluid phase pressure drops and nonoperative volumes and achieve true countercurrent contact patterns for solid phases and fluid phases. Another objective is to allow incremental renewal of heat or mass storage medium in the apparatus so that less storage medium is required to achieve the same operational efficiency. Still another objective is to reduce the required sealing area between a hot section and a cold section in a heat exchanger case, or between an adsorption section and a desorption section in an adsorption case.

SUMMARY OF THE INVENTION

The present invention is an apparatus comprising two channels for heat or mass transfer operations and multitude of solid blocks that contain solid heat or mass storage medium. A mechanism to push solid blocks back and forth between the said two channels is devised.

The counter-current apparatus uses multitude of solid blocks to carry mass storage or heat storage medium to two opposite sides of mass and heat transfer operations. The said multitude of solid blocks are pushed in a clockwise or counterclockwise pattern incrementally through two channels. The energy of sensible heat or mass of selected species from a first fluid stream transfers into the solid blocks in a first channel and is stored in the solid storage medium within. Those solid blocks loaded with energy or specific mass from the first channel are pushed one by one to a second channel in which the energy or specific mass stored within is released to a second fluid stream. The solid blocks after releasing energy or specific mass in the second channel are pushed back into the first channel, continuing the heat transfer or mass transfer cycle. Counter-current flows of the fluid phase and the solid phase are achieved in both channels, for a combined adsorption and desorption cycle, or a combined heating and cooling cycle.

The present invention is a solid/fluid counter-current contact apparatus having two parallel channels containing a plurality of solid blocks within their internal volume for mass or heat transfer, wherein ends of the two parallel channels are aligned at both sides of the two parallel channels. The plurality of solid blocks are positioned so as to line up inside the two parallel channels. A first middle section connects the two parallel channels at one side, and a second middle section connects two parallel channels at an opposite side. The plurality of solid blocks comprise a solid block that occupies the first middle section and another solid block that occupies the second middle section. A first set of plungers are positioned at respective ends of the two parallel channels. The first set of plungers are adapted to push solid blocks from one channel of the two parallel channels to another channel of the two parallel channels through the first middle section and second middle section. A second set of plungers are positioned at respective ends of the two parallel channels adapted to push solid blocks along respective lengths of the two parallel channels between the first and second middle sections.

In an embodiment, the plurality of solid blocks have non-porous side frames and a porous interior for fluid flow. The solid blocks may have screens at front and back ends thereof. The solid blocks may comprise particulate solid matter.

In an embodiment, the solid blocks comprise an assembly of solid materials. The assembly of solid materials may be selected from a group consisting of: steel plates, steel mesh, steel fiber, ceramic plate, ceramic honeycomb, plastic plate, plastic strips and plastic fiber.

In an embodiment, the two parallel channels and the first and second middle sections form a rectangular shape, wherein the first set of plungers are directed in opposite and parallel directions, wherein the second set of plungers are directed in opposite and parallel directions.

In an embodiment, the current contact apparatus has a first inlet positioned at one end of a first channel of the two parallel channels and a first outlet positioned at an opposite end thereof, such that a process stream can be directed through the first channel from the first inlet to the first outlet. A second inlet is positioned at one end of a second channel of the two parallel channels and a second outlet positioned at an opposite end thereof, such that a regeneration stream can be directed through the second channel from the second inlet to the second outlet, said process stream flowing in an opposite and parallel direction than said regeneration stream.

In an embodiment, each of the plurality of solid blocks have a width and a depth, or a diameter, wherein each of the two parallel channels has an interior width substantially equal to the width of a solid block, or the diameter, such that the solid block substantially fills the width of the channel and prevents fluid flow therebetween, wherein each of the first and second middle sections has an interior width substantially equal to the depth of a solid block, such that the solid block substantially fills the width of the middle section and prevents fluid flow therebetween.

In an embodiment, the first and second middle sections are longer than the width of a solid block to prevent fluid leaking through the interior of the solid block.

The present invention is also a method of providing solid/fluid counter-current contact comprising the following steps: providing a loop of channels comprising a first parallel channel, a second parallel channel and first and second middle sections connecting the first parallel channel with the second parallel channel; arranging a plurality of solid blocks in the loop of channels, the plurality of solid blocks snugly fitting with the loop of channels; flowing a process stream through the first parallel channel, the process stream flowing through the plurality of solid blocks; flowing a regeneration stream through the second parallel channel, the regeneration stream flowing through the plurality of solid blocks; and moving the plurality of solid blocks through the loop of channels in a direction opposite a direction of the flow of the process stream.

In an embodiment, the method further includes positioning plungers at corners of the loop of channels, the step of moving being accomplished by sequential operation of the plungers.

In an embodiment, an interior of the loop of channels is capable of holding a number n of solid blocks, wherein n-2 blocks are arranged within the interior of the loop of channels.

In an embodiment, the plurality of solid blocks have non-porous side frames and a porous interior for fluid flow. The plurality of solid blocks may comprise particulate solid matter, the plurality of solid blocks having screens at front and back ends for containing the particulate solid matter.

In an embodiment, the solid blocks may comprise an assembly of solid materials. The assembly of solid materials may be selected from a group consisting of: steel plates, steel mesh, steel fiber, ceramic plate, ceramic honeycomb, plastic plate, plastic strips and plastic fiber.

In an embodiment, the process stream is a hot fluid stream for heat transfer operations, or a rich material stream for mass transfer operations.

In an embodiment, the regeneration stream is a cold fluid stream for heat transfer operations, or a lean material stream for mass transfer operations.

BRIEF DESCRIPTION OF DRAWINGS

FIG. 1 shows the starting positions of all the solid blocks.

DETAILED DESCRIPTION OF THE INVENTION

The apparatus of the present invention uses solid medium to extract thermal energy or selected material from a process stream and use a regeneration stream to regenerate the used solid medium. The thermal energy or selected material is transferred eventually from the process stream to the regeneration stream, with the solid as the mass transfer or heat transfer medium. The process stream can be a hot fluid stream for heat transfer operation, or a rich material stream for mass transfer operation. The regeneration stream can be a cold fluid stream for heat transfer operation, or a lean material stream for mass transfer operation.

Figure 1:
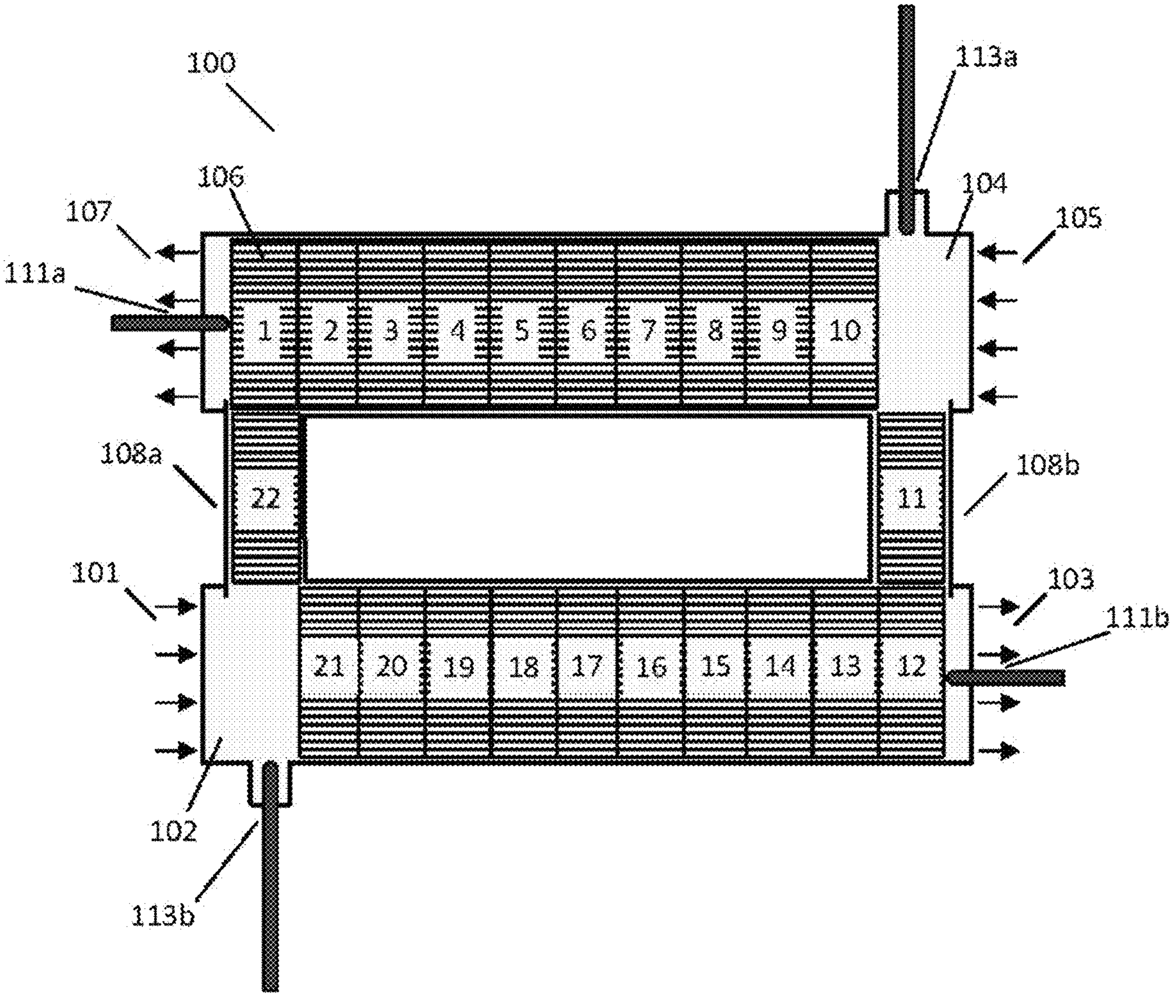
FIG. 1 is the first horizontal cutout view of the counter-current heat transfer/adsorption apparatus 100 which comprises two channels 102 and 104 and solid blocks 106 (numbered from 1 to 22), plungers 111*a*, 111*b*, 113*a* and 113*b* that are used to push solid blocks.

Referring to FIG. 1, apparatus 100 comprises of two channels 102 and 104 and solid blocks 106 (numbered from 1 to 22), plungers 111*a*, 111*b*, 113*a* and 113*b* that are used to push solid blocks. FIG. 1 shows the starting positions of all the solid blocks. A process stream 101 enters channel 102, flows though solid blocks 12-21, and leaves channel 102 as stream 103. A regeneration stream 105 enters channel 104, flows though solid blocks 1-10, and leaves channel 104 as stream 107. There are two middle sections 108*a* and 108*b* that also hold a solid block in each of them. Blocks 11 and 22 in the middle sections are not involved with mass or heat transfer operation at this step, they are used for sealing purposes to prevent leaking of fluids from channel 102 to channel 104, or vice versa. The middle sections should be longer than the width of a solid block otherwise fluid would leak through the porous interior of the solid block.

FIG. 1, by way of example, illustrates 22 blocks within the channels and middle sections, whereas the entire assembly 100 is capable of holding 24 blocks. This allows for the blocks to be moved within the channels and middle sections. In any case, where the capacity of the channels and middle sections is n number of blocks, the actual number of blocks container therein is n-2.

Figure 2A:
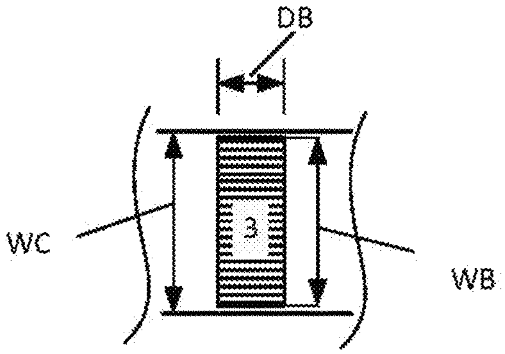
FIGS. 2A and 2B illustrate how the solid blocks fit snugly within the two parallel channels and middle sections.
Figure 2B:
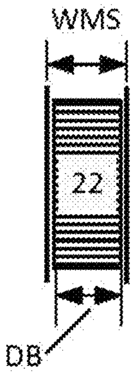
Figure 3:
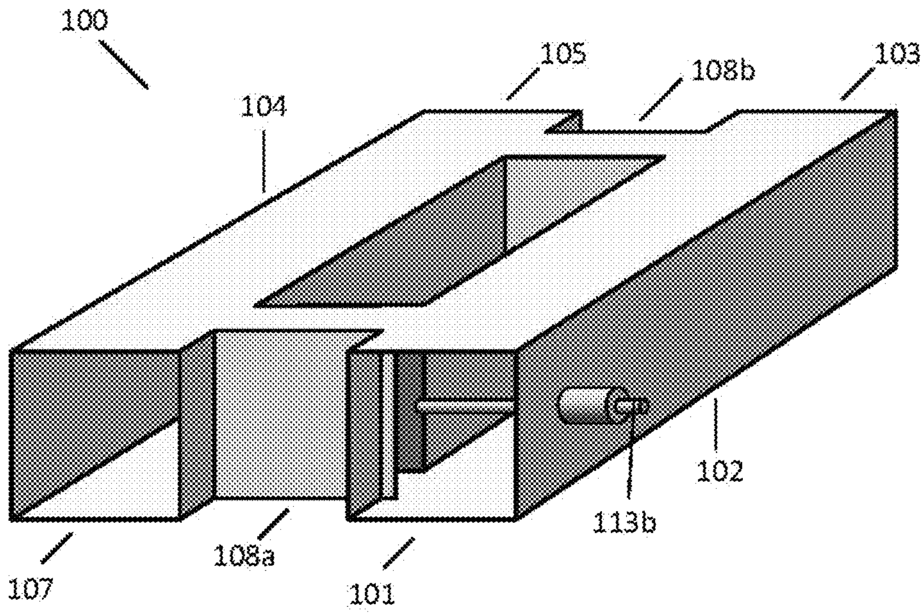
FIG. 3 is a perspective view of the countercurrent heat transfer/adsorption apparatus 100 with two channels 102, 104 and plunger 113*b*.

FIG. 2A is an isolated view illustrating a solid block within one of the two parallel channels. The block 3 has a width WB and a depth DB. The width WB is substantially equal to but slightly less than the width WC of the channel. FIG. 2B illustrates the block 22 within one of the middle sections, the block 22 having the same dimensions WB and DB as the block 3. The middle section has a width WMS that is substantially equal to but slightly greater than the depth DB of the block 22. As such, the blocks snugly fit within the channels and middle sections, and retain the ability to move within the channels and middle sections without allowing fluid flow there around. Within the concept of the present invention, the blocks may have non-rectangular prism forms. In the case of spherical solid forms, for example, the diameter of the solid form should be substantially equal to but slightly less than a diameter of the channel through which the solid form moves FIG. 3 is a perspective view of the countercurrent heat transfer/adsorption apparatus 100 with two channels 102, 104 and plunger 113*b*. Plungers 111*a*, 111*b* and 113*a* are not shown. This apparatus is rotational symmetric, and plunger 113*a* is hidden behind the wall of channel 104. A process stream 101 enters channel 102 from the left side and exits as stream 103 from the right side. A regeneration stream 105 enters channel 104 from the right side and exits the left side as stream 107. Middle sections 108*a* and 108*b* are sized for a snug fit of one solid block each. Solid blocks are removed from two channels 102 and 104 for better viewing.

Figure 4:
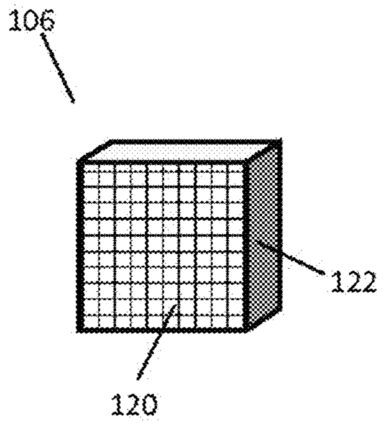
FIG. 4 is a perspective view of solid block 106 with a block frame 122 and solid storage medium 120.

FIG. 4 is a perspective view of solid block 106 with a block frame 122 and solid storage medium 120. As used herein, the term "solid block" refers to a block shape comprising solids materials, including an assembly of non-porous solid materials with space in between, as well as porous solids materials in block form. The face 120 of the solid blocks facing the flow direction can be in a rectangular shape, or in a round shape, or in any shape that allows fluid flow through the block and proper sealing between the hot (or adsorption) and the cold (or desorption) channels. The solid storage medium 120 could be anything that stores thermal energy or targeted material species. Examples for heat transfer operation could be steel plates, steel mesh, steel fiber, ceramic plate, ceramic honeycomb, plastic plate, plastic strips, plastic fiber, etc. In fact, all solid materials can store thermal energy. The selection of heat transfer medium is then based on heat capacity, heat conductivity, density, mechanical strength, corrosion resistance and cost. Examples for mass transfer operation could be ion exchanger resin beads, activated carbon particles, adsorbents such as zeolite, silica gel and alumina, etc. When solid mass storage medium is in particulate form, screens are used to hold the particles. The selection of mass transfer medium is based on storage capacity for the targeted species, mass transfer rate and cost.

Figure 5:
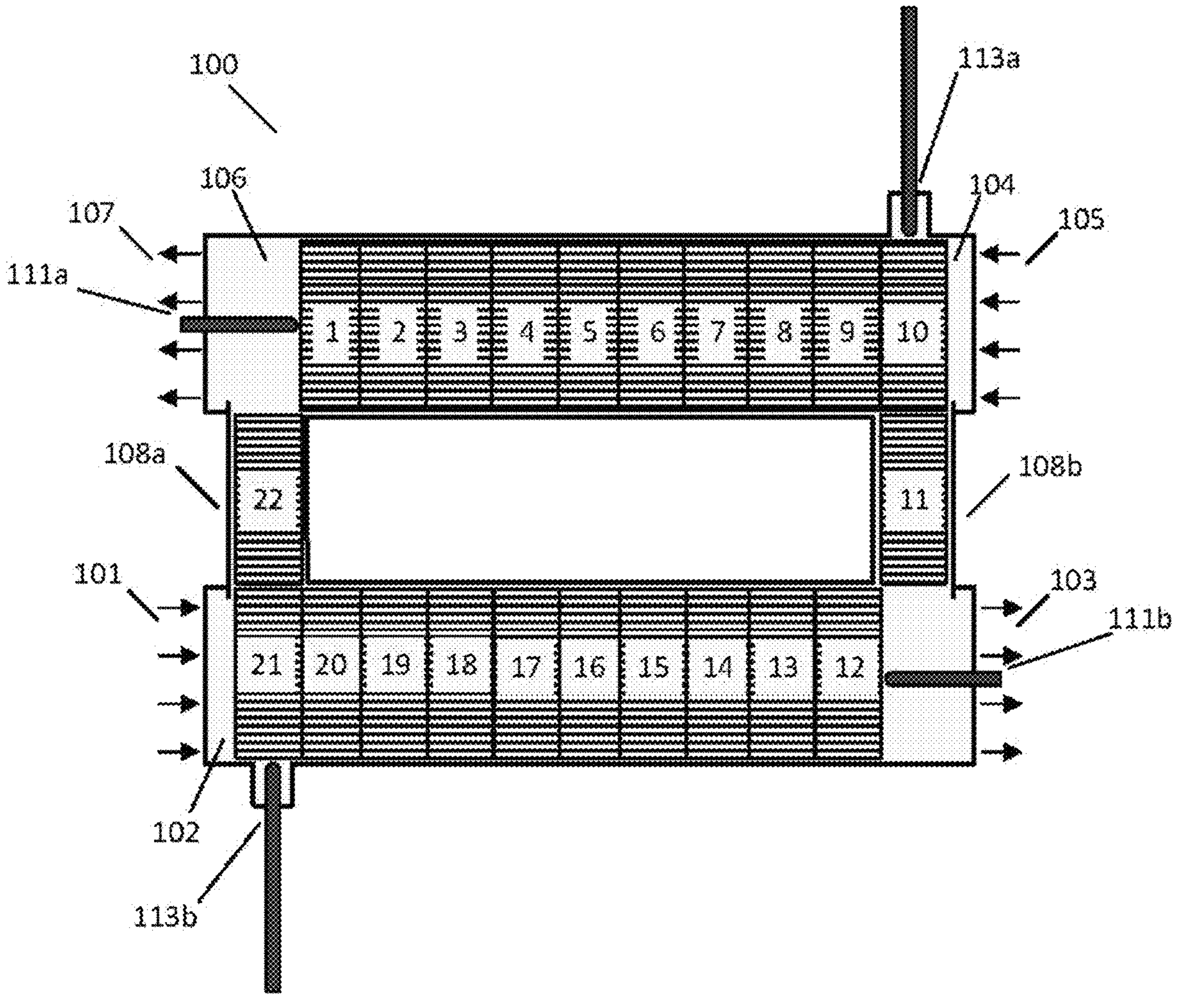
FIG. 5 is the second horizontal cutout view of the countercurrent heat transfer/adsorption apparatus 100. This view shows the block positions after plunger 111*a* pushed solid blocks 1-10 to the right end of channel 104 and plunger 111*b* pushed solid blocks 12-21 to the left end of channel 102.

FIG. 5 is the second horizontal cutout view of the countercurrent heat transfer/adsorption apparatus 100. This view shows the block positions after plunger 111*a* pushed solid blocks 1-10 to the right end of channel 104 and plunger 111*b* pushed solid blocks 12-21 to the left end of channel 102. A process stream 101 flows from left to right, while solid blocks 12-21 are pushed from right to left. A regeneration stream 105 flows from right to left, while solid blocks 1-10 are pushed from left to right. For waste heat recovery operation, an example process stream is a hot flue gas stream from a combustion furnace and the corresponding regeneration stream is a cold stream that supplies combustion air to the said furnace. For lithium adsorption operation with adsorbents, an example of a process stream is a lithium rich brine stream from a salty lake and the corresponding regeneration stream is a liquid stream without lithium and at different pH from said process stream. The fluid flow directions and solid move directions are opposite of each other. Those solids-fluids contact patterns are countercurrent operations.

Figure 6:
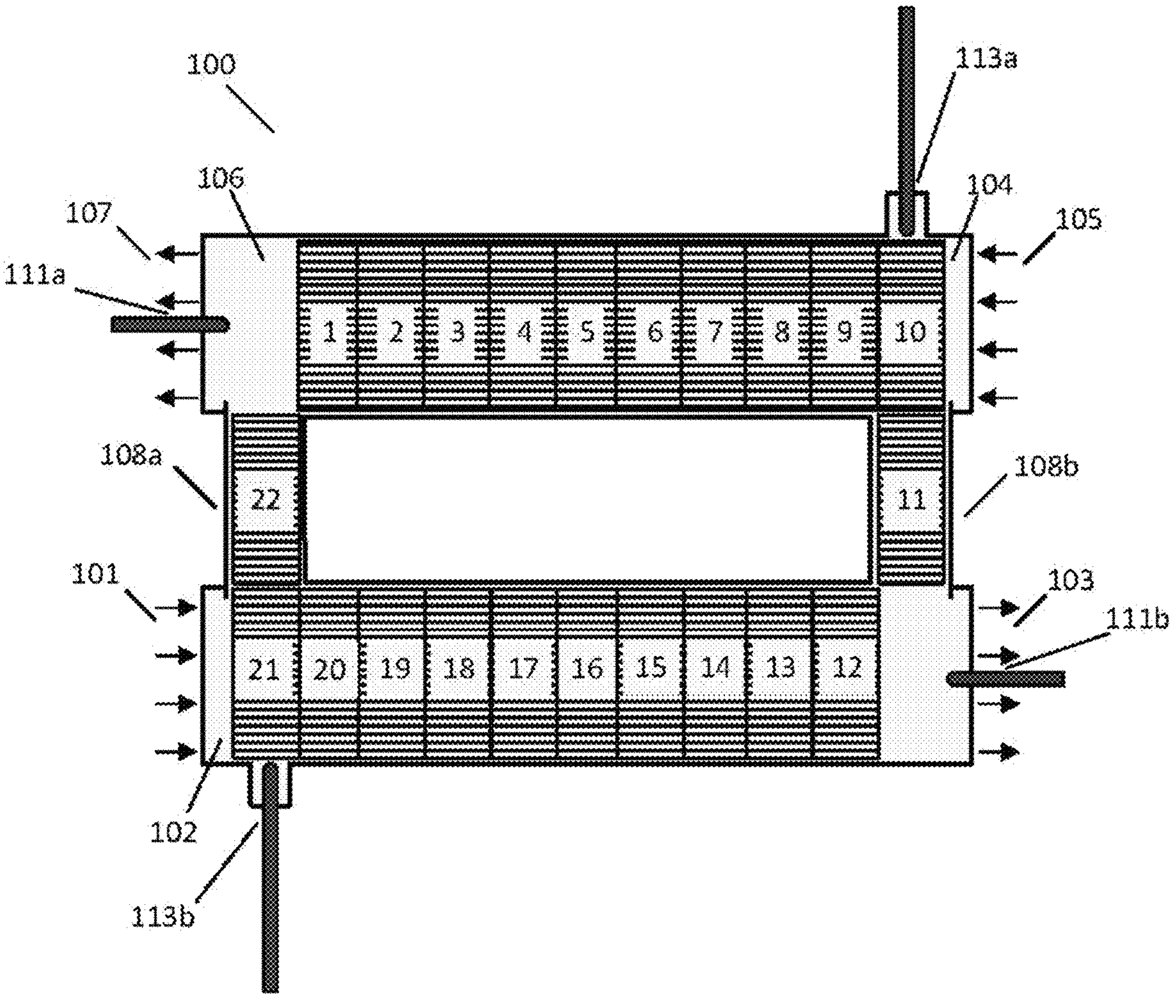
FIG. 6 is the third horizontal cutout view of the counter-current heat transfer/adsorption apparatus 100. This view shows that the plungers 111*a* and 111*b* are pulled back to allow the next movements of solid blocks.

FIG. 6 is the third horizontal cutout view of the countercurrent heat transfer/adsorption apparatus 100. This view shows that the plungers 111*a* and 111*b* are pulled back to allow the next movements of solid blocks.

Figure 7:
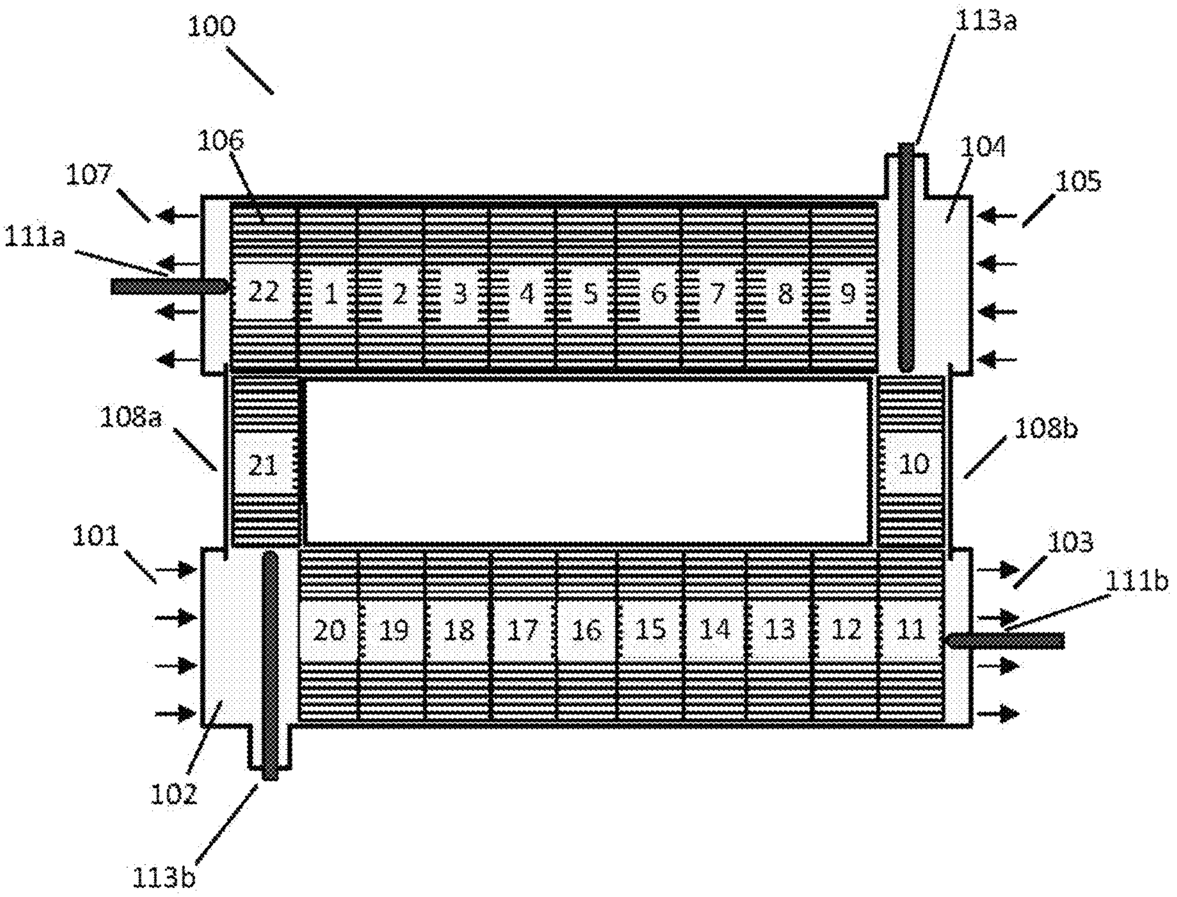
FIG. 7 is the fourth horizontal cutout view of the countercurrent heat transfer/adsorption apparatus 100. This view shows the block positions after plunger 113*b* pushed solid block 22 to channel 104 and plunger 113*a* pushed solid block 11 to channel 102.

FIG. 7 is the fourth horizontal cutout view of the countercurrent heat transfer/adsorption apparatus 100. This view shows the block positions after plunger 113*b* pushed solid block 22 to channel 104 and plunger 113*a* pushed solid block 11 to channel 102. Blocks 21 and 10 are pushed to the middle positions 108*a* and 108*b* from channels 102 and 104, respectively.

Figure 8:
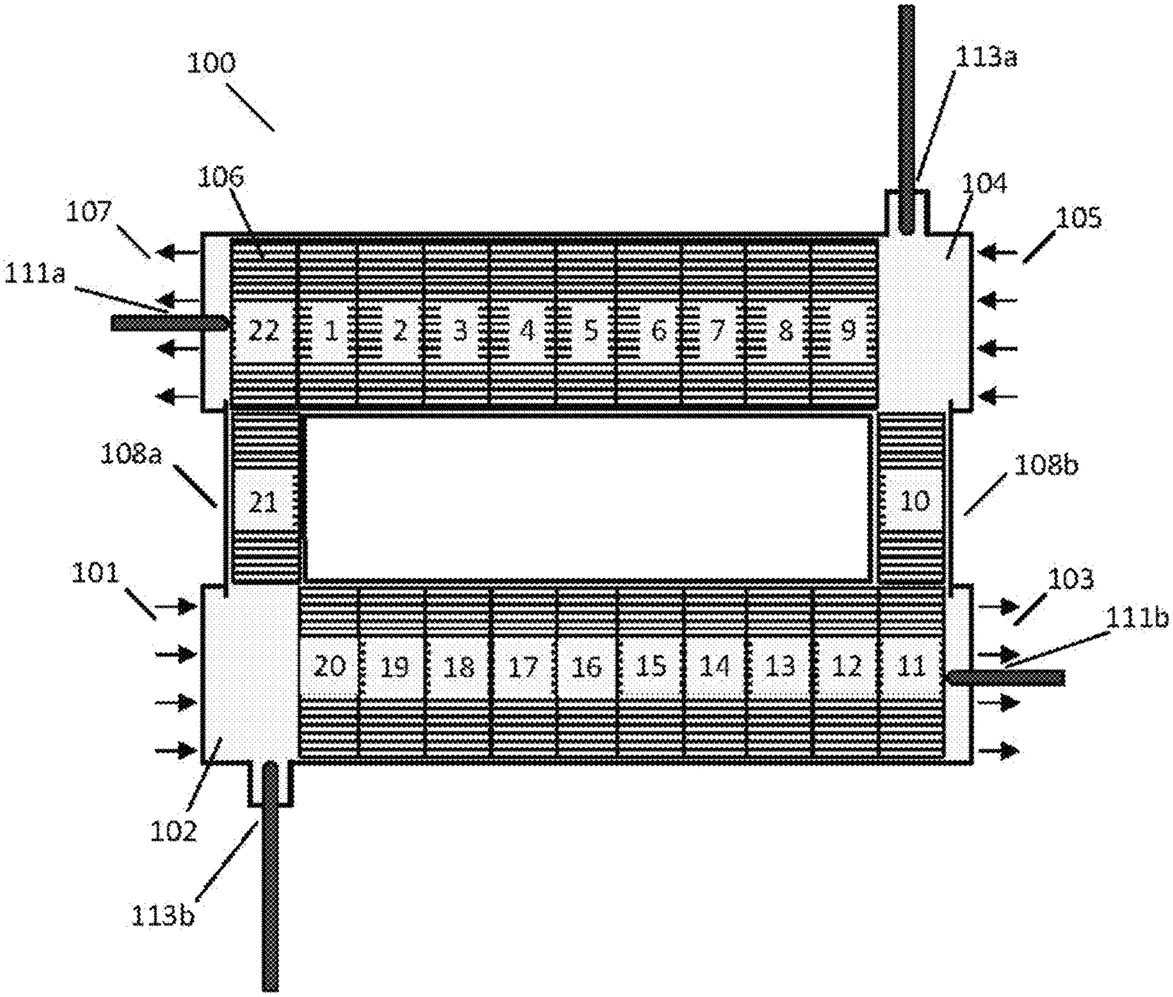
FIG. 8 is the fifth horizontal cutout view of the counter-current heat transfer/adsorption apparatus 100. This view shows that the plungers 113*a* and 113*b* are pulled back to allow the next movements of solid blocks. This view returns to the first cutout view configuration as shown in FIG. 1, except for that all block numbers have shifted clockwise one step.

FIG. 8 is the fifth horizontal cutout view of the countercurrent heat transfer/adsorption apparatus 100. This view shows that the plungers 113*a* and 113*b* are pulled back to allow the next movements of solid blocks. This view returns to the first cutout view configuration as shown in FIG. 1, except for that all block numbers have shifted clockwise one step. As plungers 111*a* and 111*b* push and retreat again, and plungers 113*a* and 113*b* push and retreat again, all solid blocks shift another step clockwise. With 22 synchronized pushes by four plungers, the whole setup could return to FIG. 1 configuration exactly, with all blocks making a 360° rotation. The time duration for a 360° rotation of all blocks is called the period of operation.

While the apparatus is shown with a rectangular configuration, it is within the concept of the present invention that the apparatus may take the form of other loop or looped structures through which the solid blocks pass.

In comparison of this technology with traditional rotational regenerative heat exchangers, such as Ljungström air preheater as described by the landmark U.S. Pat. No. 1,746,598, this invention could have better efficiency and requires much less solid thermal energy storage medium. This technology requires as little as 5-10% thermal storage mass of Ljunström's rotary bed technology.

The reason behind this difference in solid mass requirements between the present invention versus Ljungström technology is in the different ways of solid-gas contacting. As the bed rotates with Ljungström technology, an increment of solid is rotated into the cold section from the hot section, and at the same time an increment of solid is rotated into hot section from the cold section. The incremental movement of solid, however, is not opposite to the flow direction, rather, it is perpendicular to the flow direction.

In Ljungström, as an incrementally small pie section of the bed from the cold section enters the hot section via the axle rotation, the whole vertical depth of the small pie section enters the hot section at the same time. After rotation of 180° or after time duration of half a period, the whole depth of this pie section would exit the hot section at the same time. Except for temperature changing as a function of time or as a function of rotation, this pie section is not interacting with other solid sections and is not moving in vertical direction. This is equivalent to heating a single column of solid medium of the same area and same depth, from time zero to the time of ½ period (turning 1800) without moving solid at all.

Whereas in the present invention, as shown in the example of FIG. 1 and FIGS. 5-8, eleven (11) solid blocks would have moved counter-currently to the gas flow direction in ½ period. Since solid blocks in the present invention are regenerated faster than Ljungström technology would allow, the present invention requires much less mass to achieve the same thermal efficiency.

Another issue that needs to be considered is the purging of solid beds. Solid beds have void within to allow fluid flow, and open space at the top and bottom for solid support, fluid introduction and collection. The existing fluid in those volumes needs to be displaced by the new incoming fluid when switching from cold to hot or hot to cold.

Since the Ljungström air preheater switches the whole depth of the bed, more gas volume needs to be displaced at each switching step. The system and method of the present invention switches only a small fraction of the bed depth, resulting in more efficient purging.

EXAMPLE

A comparison study of the technology of the present invention with Ljungström technology is shown in Table 1.

TABLE 1

| | $T_{HOT\_IN}$ = 232° C. $T_{COLD\_IN}$ = 27° C. Calculation Results of Regenerative Heat Exchangers | | | | |
|---|---|---|---|---|---|
| | ICC (16 Sections) | | Ljungström | | |
| Weight (kg) | 5 | 50 | 5 | 5 | 50 |
| Period (s) | 80 | 80 | 10 | 80 | 80 |
| $T_{HOT\_OUT}$ (° C.) | 29.5 | 29.3 | 29.7 | 74.5 | 29.5 |
| Thermal Eff | 98.77% | 98.88% | 98.67% | 76.85% | 98.78% |
| Purge Eff | 98.77% | 98.98% | 87.67% | 98.56% | 98.74% |
| Total | 97.55% | 97.87% | 86.50% | 75.75% | 97.54% |

Different total mass of solid medium and different period are used to calculate efficiencies and outlet temperature of a hot gas. The hot gas comes in at 232° C., and the cold gas comes in at 27° C.

The operating conditions, physical and heat transfer parameters are listed in Table 2.

TABLE 2

| Variables | Values | Units | Variables | Values | Units |
|---|---|---|---|---|---|
| Air mass flow Qa | 79.2 | kg/hr | Flue pressure inlet Ph1 | 106307 | pascal |
| Flue mass flow Qf | 79.2 | kg/hr | Flue pressure outlet Ph2 | 101325 | pascal |
| Air heat capacity Cpa | 1060 | J/Kg/K | Air pressure inlet Pc1 | 106307 | pascal |
| Flue heat capacity Cpf | 1060 | J/Kg/K | Air pressure outlet Pc2 | 101325 | pascal |
| Solid heat capacity Cps | 765 | J/Kg/K | Cross-sectional area CSA | 0.0314 | $m^2$ |
| Solid density ps | 7970 | $kg/m^3$ | Bed volume | 0.0314 | $m^3$ |
| Bed diameter D | 0.2 | M | Volumetric flow flue gas | 0.030 | $m^3/s$ |
| Bed Height H | 1 | M | Residence time flow gas | 0.51 | S |
| Flue heat transfer coeff. Uh | 92.7 | $W/m^2/k$ | Total heat transfer area A | 94.25 | $m^2$ |
| Air heat transfer coeff. Uc | 92.7 | $W/m^2/k$ | Flue temperature inlet Th1 | 232.22 | ° C. |
| Heat transfer area/volume | 3000 | $m^2/m^3$ | Air temperature inlet Tc1 | 27 | ° C. |

It can be seen from Table 1 that an incremental counter-current (ICC) heat exchanger is not sensitive to bed mass, and it functions well with extremely low bed mass. As bed mass is increased from 5 kg to 50 kg, only a slight improvement in efficiency is made. On the other hand, a Ljungström heat exchanger requires much more bed mass for energy storage and release. It does not function well without enough mass such as 5 kg cases. At 5 kg bed mass, either the thermal efficiency is bad with 80 seconds period, or the purge efficiency is bad with 10 seconds period. Once enough mass is used, such as in the 50 kg case, the Ljungström heat exchanger is able to match the performance of an incremental counter-current (ICC) heat exchanger at 5 kg.

The technology of the present invention requires bed mass of only 5-10% of that of Ljungström APH, is easier to seal and leaks less than Ljungström APH, because only two blocks are switched at each synchronized push cycle, in contrast to Ljunström APH which needs to seal a large bed.

This apparatus causes minimal fluid phase pressure drops because the fluid passages are straight through. There is no nonoperative volume because each solid block does not have an entrance zone or an exit zone as is required for a solid bed in a vessel, and there is no piping between solid blocks as is required for apparatuses of U.S. Pat. Nos. 11,738,286, 11,083,980, and 10,589,190.

The invention claimed is:

1. A solid/fluid counter-current contact apparatus comprising:

two parallel channels containing a plurality of solid blocks within their internal volume for mass or heat transfer, wherein ends of the two parallel channels are aligned at both sides of the two parallel channels;

wherein the plurality of solid blocks are positioned so as to line up inside the two parallel channels;

a first middle section that connects the two parallel channels at one side, and a second middle section that connects two parallel channels at an opposite side;

wherein the plurality of solid blocks comprise a solid block that occupies the first middle section and another solid block that occupies the second middle section;

a first set of plungers positioned at respective ends of the two parallel channels, the first set of plungers adapted to push solid blocks from one channel of the two parallel channels to another channel of the two parallel channels through the first middle section and second middle section; and a second set of plungers positioned at respective ends of the two parallel channels adapted to push solid blocks along respective lengths of the two parallel channels between the first and second middle sections.

2. The solid/fluid counter-current contact apparatus of claim 1, wherein said plurality of solid blocks have non-porous side frames and a porous interior for fluid flow.

3. The solid/fluid counter-current contact apparatus of claim 2, wherein said solid blocks have screens at front and back ends thereof.

4. The solid/fluid counter-current contact apparatus of claim 3, wherein the solid blocks comprise particulate solid matter.

5. The solid/fluid counter-current contact apparatus of claim 1, wherein the solid blocks comprise an assembly of solid materials.

6. The solid/fluid counter-current current apparatus of claim 5, wherein the assembly of solid materials is selected from a group consisting of: steel plates, steel mesh, steel fiber, ceramic plate, ceramic honeycomb, plastic plate, plastic strips and plastic fiber.

7. The solid/fluid counter-current current apparatus of claim 1, wherein the two parallel channels and the first and second middle sections form a rectangular shape, wherein the first set of plungers are directed in opposite and parallel directions, wherein the second set of plungers are directed in opposite and parallel directions.

8. The solid/fluid counter-current contact apparatus of claim 1, further comprising:

a first inlet positioned at one end of a first channel of the two parallel channels and a first outlet positioned at an opposite end thereof, such that a process stream can be directed through the first channel from the first inlet to the first outlet; and a second inlet positioned at one end of a second channel of the two parallel channels and a second outlet positioned at an opposite end thereof, such that a regeneration stream can be directed through the second channel from the second inlet to the second outlet, said process stream flowing in an opposite and parallel direction than said regeneration stream.

9. The solid/fluid counter-current contact apparatus of claim 1, each of the plurality of solid blocks having a width and a depth, or a diameter, wherein each of the two parallel channels has an interior width substantially equal to the width of a solid block, or the diameter, such that the solid block substantially fills the width of the channel and prevents fluid flow therebetween, wherein each of the first and second middle sections has an interior width substantially equal to the depth of a solid block, such that the solid block substantially fills the width of the middle section and prevents fluid flow therebetween.

10. The solid/fluid counter-current contact apparatus of claim 9, wherein the first and second middle sections are longer than the width of a solid block to prevent fluid leaking through the interior of the solid block.

11. A method of providing solid/fluid counter-current contact comprising:

providing a loop of channels comprising a first parallel channel, a second parallel channel and first and second middle sections connecting the first parallel channel with the second parallel channel;

arranging a plurality of solid blocks in the loop of channels, the plurality of solid blocks snugly fitting with the loop of channels;

flowing a process stream through the first parallel channel, the process stream flowing through the plurality of solid blocks;

flowing a regeneration stream through the second parallel channel, the regeneration stream flowing through the plurality of solid blocks; and moving the plurality of solid blocks through the loop of channels in a direction opposite a direction of the flow of the process stream.

12. The method of claim 11, further comprising:

positioning plungers at corners of the loop of channels, the step of moving being accomplished by sequential operation of the plungers.

13. The method of claim 11, wherein an interior of the loop of channels is capable of holding a number n of solid blocks, wherein n-2 blocks are arranged within the interior of the loop of channels.

14. The method of claim 11, wherein said plurality of solid blocks have non-porous side frames and a porous interior for fluid flow.

15. The method of claim 14, wherein the plurality of solid blocks comprise particulate solid matter, the plurality of solid blocks having screens at front and back ends for containing the particulate solid matter.

16. The method of claim 14, wherein the solid blocks comprise an assembly of solid materials.

17. The method of claim 16, wherein the assembly of solid materials is selected from a group consisting of: steel plates, steel mesh, steel fiber, ceramic plate, ceramic honeycomb, plastic plate, plastic strips and plastic fiber.

18. The method of claim 11, wherein the process stream is a hot fluid stream for heat transfer operations, or a rich material stream for mass transfer operations.

19. The method of claim 11, wherein the regeneration stream is a cold fluid stream for heat transfer operations, or a lean material stream for mass transfer operations.

* * * * *